Figure 1:
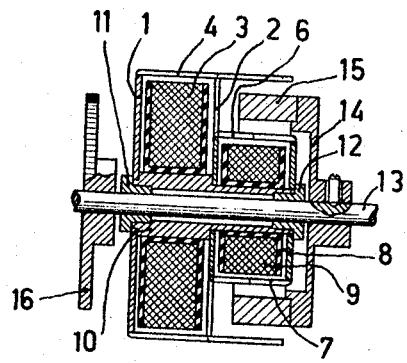

Jan. 31, 1967  J. F. BRANDWIJK  3,302,046
STEP MOTOR

Filed Sept. 29, 1964  2 Sheets-Sheet 1

INVENTOR.
JOHANNES F. BRANDWIJK
BY
*Frank R. Trifari*
AGENT

United States Patent Office 3,302,046
Patented Jan. 31, 1967

3,302,046
STEP MOTOR
Johannes Fredrik Brandwijk, Hendon, Adelaide, South Australia, Australia, assignor to North American Philips Company, Inc., New York, N.Y., a corporation of Delaware
Filed Sept. 29, 1964, Ser. No. 400,154
Claims priority, application Netherlands, Oct. 24, 1963, 299,711
4 Claims. (Cl. 310—49)

The invention relates to a step motor of low power for $n$ steps per revolution, said motor comprising two coaxial stators, the annular coils of which are positioned between two plates of ferromagnetic material, having annularly arranged poles in the form of teeth, which co-operate with also annularly arranged, alternating north and south poles of at least one permanent magnetic rotor, the number of rotor poles per stator being equal to that of each of the stators, while an angle of 90 electric (el.) degrees is provided between the position of the poles of one stator relative to the associated rotor poles on the one hand and the position of the poles of the other stator relative to the associated rotor poles on the other hand.

According to a feature of the step motor according to the invention the driving torque of one stator (auxiliary stator), the poles of which lead by 90 el. degrees in the direction of rotation of the motor with respect to the poles of the other stator (main stator) determine on the one hand the direction of rotation of the motor completely, but on the other hand the holding torque thereof, in the unexcited state of the motor, is so low that the rest positions of the rotor are solely determined by the poles of the main stator.

The advantage of such a motor is that a mechanical stop fixing the positions of the rotor can be dispensed with and that the disadvantages thereof i.e. that the motor has to overcome the couple of the stop which reduces the useful effective couple and the wear of the stop are avoided. Such a stop is employed in rotating switches, clocks, self-registering meters and the like. Particularly in those cases in which manual adjustment is required, so that it is necessary to feel accurately the number of steps over which for example a wheel has to be displaced, such a structure is advantageous.

The simplest method for feeding the two stators of such motors is to employ the same direct-current pulse, while by means of a phase-shifting element, for example a capacitor the current through the auxiliary stator is shifted in phase relatively to the current passing through the main stator. The rotor is displaced first in the correct direction by the auxiliary stator and is then brought by the main stator into its new holding position. If the main poles and the auxiliary poles were equivalent, twice the number of holding positions would be twice the number of steps per rotation in the unexcited state of the motor, which is very troublesome for refinding a given position.

The holding couple of the auxiliary stator may be chosen smaller than that of the main stator, for example by providing a weaker magnetisation of the stator on the inner side. This may sometimes be objectionable, since the intensity of magnetisation cannot always be controlled, if magnetisation is not complete. A second method consists in providing a larger air gap between the auxiliary stator and the auxiliary rotor. This is less advantageous, since then the useful coil volume of the auxiliary stator decreases.

In the step motor according to the invention the length of the poles of the auxiliary stator is preferably chosen smaller than that of the poles of the main stator, so that a correct choice of the holding couple and the useful driving torque can be made.

By constructing the rotor, in accordance with a further feature of the invention, in the form of a ring magnetised on the inner and on the outer side in a radial direction, the poles of the main stator being arranged around it, while the auxiliary stator is accommodated inside the ring, a very compact structure of the motor is obtained, the volume being thus reduced approximately by half.

Figure 3:
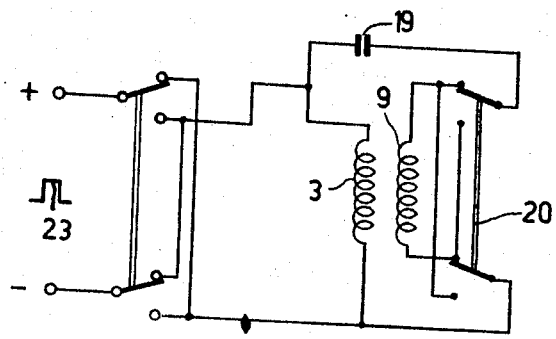
Figure 4:
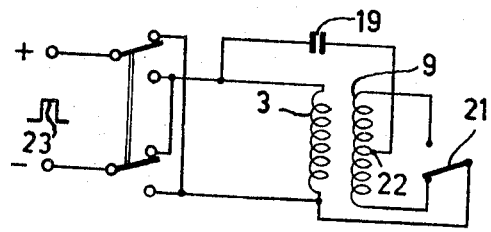
Figure 2:
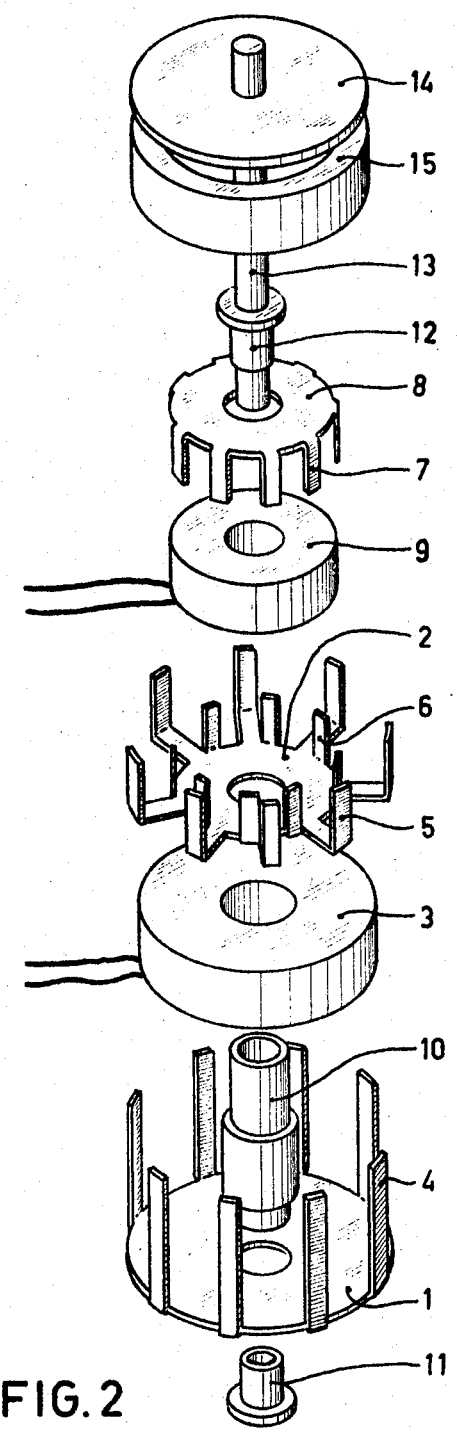

The foregoing will be described more fully in the following description of the figures, of which
FIG. 1 is a sectional view of one embodiment of a motor according to the invention,
FIG. 2 is a perspective view of the parts and
FIGS. 3 and 4 show a few possible control-arrangements of the motor shown in FIGS. 1 and 2.

Referring to FIGS. 1 and 2 the main stator comprises a main stator plate 1 and an intermediate stator plate 2, of ferromagnetic material, between which an annular main stator coil 3 is arranged. The main stator plate 1 is provided with main stator poles 4, arranged in a circle and co-operating with main poles 5 provided on the intermediate plate 2 also in a circle. When assembled, the poles 5 nest between poles 4 and poles 4 and 5 have opposite magnetic polarity. This intermediate stator plate 2 is furthermore provided with a second row of poles 6 (auxiliary stator poles) arranged concentrically to the main stator poles 5 which are shifted through 90 el. degrees relatively to the main stator poles 5 in the direction of rotation of the motor. Thus the direction of rotation of the motor is completely determined. The auxiliary stator poles 6 are directed toward the space between adjacent teeth 7 but don't enter this space to co-operate with the auxiliary stator poles 7 of the auxiliary stator plate 8 also of ferromagnetic material. Between the intermediate stator plate 2 and the auxiliary stator plate 8 there is arranged an annular auxiliary stator coil 9. Thus the magnetic polarity of these poles 6 and 7 is also opposite. The assembly is centered and held by a sleeve 10, the edges of which are flanged. The sleeve 10 accommodates two bearings 11 and 12 receiving a shaft 13, on which a disc 14 is mounted. An annular permanent magnet 15, magnetised radially so that it has alternating opposite magnetic polarity on the inner and on the outer circumference, magnet 15 is integral with the disc 14, and rotates between the main stator poles 4, 5 and the auxiliary stator poles 6, 7. The auxiliary stator poles 6, 7 are shorter than the main stator poles 4, 5 so that the holding couple, in the unexcited state of the motor, is so small that the holding position of the rotor is solely determined by the main stator poles.

By arranging the auxiliary stator poles 6 and 7 adjacent the inner circumference of the annular permanent magnet 15, a very compact structure is obtained.

FIG. 3 shows the circuit arrangement of a motor according to the invention, which is fed by direct current pulses. When such a pulse is supplied, the current through the auxiliary stator coil will lead with respect to the current through the main stator coil 3 owing to the interposition of the capacitor 19 so that the rotor is moved in the correct direction by the auxiliary stator. The torque supplied by the auxiliary stator is just sufficient to this end. Then the rotor is driven by the main stator in the same direction in the next following holding position. For a next step the direction of the current in the coils should be reversed, which can be effected by actuating the switch 23.

For reversing the direction of rotation of the motor, the polarity of the auxiliary stator coil 9 is changed by means of the two-polar switch 20. Changing polarity can be effected with a single-pole switch 21 as well, as indicated in FIG. 4, by arranging a centre tapping 22 on the auxiliary coil 9 by using one coil half for each of the directions of rotation.

By providing a milled wheel 16 on the shaft 13, the motor can be moved manually into a number of steps distinctly marked by the holding positions. So to say a magnetic stop is thus incorporated.

What is claimed is:

1. A step motor having a plurality of steps per revolution comprising a pair of concentric stator means including a pair of coaxial annular stator coil means for defining a main coil and an auxiliary coil, said coil means being separated by a first plate of ferromagnetic material having a plurality of pairs of main stator poles and also a plurality of pairs of auxiliary stator poles, the plurality of pairs of said main stator poles being equal to said plurality of steps, said stator poles being orthogonal with said first plate and annularly arranged in concentric spaced relation about the periphery of said auxiliary coil, a pair of end plates in sandwiched relation with said stator coils, each said end plate having a plurality of pairs of stator poles, said stator poles of each said end plate being orthogonal and in annular arrangement therewith, said plurality of stator poles of one said end plate surrounding said main stator coil and extending into nesting relation between said main stator poles of said first plate surrounding said auxiliary stator coil, said plurality of stator poles of the other said end plate concentrically surrounding said auxiliary stator coil and being in concentric staggered relation with the auxiliary poles of said first plate, said main stator poles and said auxiliary stator poles defining an annular gap therebetween, an annular permanent magnet rotor in said annular gap, said rotor having inner and outer circumference surfaces adjacent said stator poles, each said circumferential surface having a plurality of magnetic poles of alternate opposite polarity equal in number to said plurality of main stator pole pairs, means for shifting the excitation of the poles of said auxiliary stator 90 electrical degrees in a leading sense with respect to the poles of said main stator thereby to determine the direction of rotation of said rotor.

2. A step motor according to claim 1 wherein the main stator poles of said first plate have a length substantially equal to twice the length of the auxiliary stator poles of said first plate and the auxiliary poles of said end plate have a length equal to the auxiliary poles of said first plate for axial compactness of said motor.

3. A motor according to claim 2 wherein said auxiliary stator poles are adjacent said inner circumferential surface of said rotor.

4. A step motor having a plurality of $\eta$ steps per revolution comprising a pair of concentric stator means including a pair of coaxial annular stator coil means for defining a main coil and an auxiliary coil, said coil means being separated by a first plate of ferromagnetic material having a plurality of $\eta$ main stator poles and also a plurality of $\eta$ auxiliary stator poles, said stator poles being orthogonal with said first plate and annularly arranged in concentric spaced relation about the periphery of said auxiliary coil, a pair of end plates in sandwiched relation with said stator coils, each said end plate having a plurality of $\eta$ stator poles, said stator poles of each said end plate being orthogonal and in annular arrangement therewith, said plurality of stator poles of one said end plate surrounding said main stator coil and extending into nesting relation between said main stator poles of said first plate surrounding said auxiliary stator coil, said plurality of stator poles of the other said end plate concentrically surrounding said auxiliary stator coil and being in concentric staggered relation with the auxiliary poles of said first plate, said main stator poles and said auxiliary stator poles defining an annular gap therebetween, an annular permanent magnet rotor in said annular gap, said rotor having inner and outer circumference surfaces adjacent said stator poles, each said circumferential surface having a plurality of magnetic poles of alternate opposite polarity, equal in number to said main stator poles, means for shifting the excitation of the poles of said auxiliary stator 90 electrical degrees in a leading sense with respect to the poles of said main stator for determining the direction of rotation of said rotor.

No references cited.

MILTON O. HIRSHFIELD, *Primary Examiner.*

J. W. GIBBS, *Assistant Examiner.*